Figure 3:
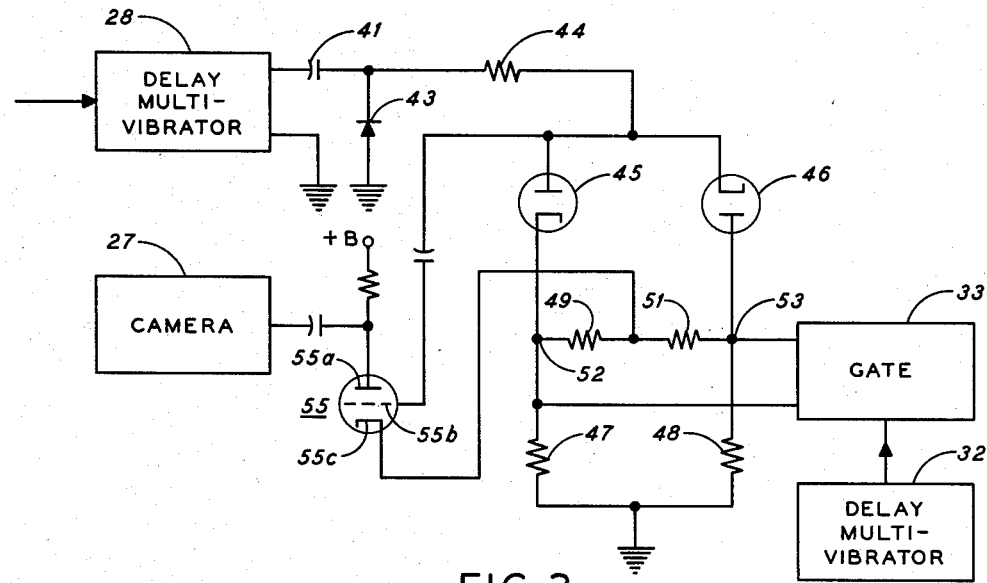

May 27, 1958 R. A. MANHART 2,836,719
METHODS AND APPARATUS FOR SHIFTING SEISMIC
RECORD TIMING PULSES
Filed Aug. 23, 1955

INVENTOR
ROBERT A. MANHART
BY
ATTORNEYS

United States Patent Office 2,836,719
Patented May 27, 1958

2,836,719

METHODS AND APPARATUS FOR SHIFTING SEISMIC RECORD TIMING PULSES

Robert A. Manhart, Fullerton, Calif., assignor to California Research Corporation, San Francisco, Calif., a corporation of Delaware Application August 23, 1955, Serial No. 530,047

9 Claims. (Cl. 250—27)

This invention relates in general to seismic prospecting, and relates more specifically to the timing systems utilized in the recording and analysis of seismic detector signals.

In the seismic prospecting art, the mechanical energy of seismic waves artificially generated in the earth is translated by means of a plurality of seismic wave detectors into electrical impulses varying in sympathy with such waves, and these impulses are amplified and recorded in some manner for analysis. Preferably, the seismic detector signals are originally recorded on a reproducible recording medium so that they may be subsequently reproduced repeatedly and at will for analysis. One of the most common types of reproducible recording medium utilized in seismic prospecting is a magnetizable element, such as a tape or drum, on which the seismic detector signals may be recorded in the form of variations in the magnetization of the recording medium.

In such recording it is customary to record on the medium simultaneously with the detector signals a suitable time scale for use in computing times and depths. Usually such a time scale comprises a train of timing signals consisting of a periodic series of substantially identical, spaced signals separated at regular intervals by a signal of distinctive character. For example, one form of train of timing signals consists of a periodic series of substantially identical pulses occurring every one-hundredth of a second, with a distinctive signal at every one-tenth of a second interval. Such timing signals may be in the form of a train of timing signals consisting of a periodic series of pulses of uniform amplitude with each tenth of a second pulse being of greater amplitude than the intervening pulses.

During playback or reproduction of the reproducibly recorded seismic detector signals, it is often desirable to shift the timing scale on the reproduced record so as to bring one of the distinctive timing signals into coincidence with a particular event or reflection on the seismic record. This shifting may be utilized, for example, where it is desired to utilize a particular event or reflection on the seismic record as a reference event and to make all time and depth computations utilizing this event as a reference. In such a case it is desirable to have a distinctive timing signal occur exactly at the time of this reference event so as to facilitate computations of the events subsequent to the reference event.

One prior art expedient sometimes utilized to effect this time shift was to shift the entire train of timing signals by the amount required to bring a distinctive timing signal into coincidence with the reference event, the normal sequence of the train of timing signals remaining the same except for the time shift. However, this system has the disadvantage that the time markings on the original reproducible record are not necessarily uniformly spaced. Such nonuniformity of spacing may result from variations in the velocity of the recording medium during the recording or to stretching or contracting of the recording medium during recording. These nonuniformly spaced timing lines still represent actual time with respect to the reproducibly recorded seismic signals, since the timing signals and the detector signals were recorded simultaneously, but these timing signals do not represent real time with respect to the detector signals if they are shifted in time by an arbitrary amount independently of the seismic detector signals.

Thus, this time shifting method of the prior art results in the introduction of error in the timing of the reproduced records, and events or reflections in the seismic detector signals will be expanded or contracted in apparent time, depending on the nature of the nonuniformity of the spacing of the original timing lines. Complete elimination of the error in this type of time scale shifting is highly improbable, since such complete elimination would result only when the spacing irregularities in the timing lines are periodic with respect to the desired time scale shift, and the probability of their being so is infinitesimal.

Another approach to this time scale shifting problem is to equalize the amplitudes of the entire train of timing signals and delay this train of timing signals by an amount corresponding to the difference between the time of occurrence of the reference event and the timing line nearest the reference event. The distinctive timing signals are then separately delayed by an amount corresponding to the difference between the time of occurrence of the reference event and the distinctive timing signal nearest the reference event, and the delayed distinctive timing signals are added to or combined with the delayed, amplitude-equalized timing signals to create a new train of timing signals starting with a distinctive timing signal at the time of the reference event. This system does eliminate the need for large time shifts, since the maximum time shift required is only 10 milliseconds, assuming a 10-millisecond spacing of the timing lines. However, this system has the disadvantage of requiring exact synchronization in time of the two series of delayed signals to be added, since if exact synchronization is not achieved, the resulting new distinctive timing pulses will be blurred and thereby reduce the accuracy of computations based thereon. The attainment of this exact synchronization requires the use of expensive and complex delay networks for the delayed timing pulses.

Broadly, the present invention contemplates methods and apparatus for effecting shifts in a train of timing signals consisting of a periodic series of substantially identical, spaced signals separated at regular intervals by a signal of distinctive character to create a new train of timing signals commencing with a signal of distinctive character at some arbitrarily selected point in the original train. More particularly the present invention contemplates the use of two parallel delay networks, a first delay network for delaying the entire train of signals by a first predetermined amount, and a second delay network for separately delaying the signals of distinctive character by a second predetermined amount. The delayed signals from the first delay network are equalized in amplitude and supplied to a losser or variable attenuator network whose gain is varied in response to a gating impulse. In the absence of a gating impulse to the losser network, these delayed signals pass through the variable losser network with constant and equal amplitudes and are supplied through an amplifier to the recording device on which the auxiliary record is to be made.

The delayed signals of distinctive character from the second delay network are utilized to activate the gating network which controls the gain of the variable losser network. When the gating network is activated by the delayed signals of distinctive character, the gate operates to increase the amplitude of the particular signal which is passing through the variable losser circuit so that this particular signal has an increased amplitude with respect to the adjacent signals. The duration of the gating impulse is preferably relatively long so that exact synchronization of the two series of delayed signals is not required. That is, by making the gating interval equal to an amount up to the interval between timing signals, the delayed signals of distinctive character may occur at any time within this gating interval and still produce a sharp timing signal in the new train of timing signals. Thus, the amplitude of selected ones of the signals passing through the variable losser network is increased to create new timing signals of distinctive character. In effect, a new train of timing signals is created, starting wth a signal of distinctive character at the predetermined reference event on the record.

In addition to the above features of the present invention, I have developed a novel variable losser circuit for selectively controlling the increase in amplitude of selected ones of the timing signals. More particularly this improved losser network comprises a voltage dividing network including a bridge network which has variable resistance elements in two arms thereof. A voltage sensing element, such as a vacuum tube, is connected across the bridge circuit to sense the voltage across the bridge portion of the voltage dividing network. In the absence of a gating pulse to the bridge circuit, the division of voltage in the voltage dividing network is such as to cause the amplitude-equalized signals to produce predetermined, equal pulses in the voltage sensing element. The voltage sensing element, in turn, transmits these pulses to the timing channel of the oscillographic camera or other recording medium on which the auxiliary record is to be made. When a gating pulse is supplied to the bridge network, the resistance of the variable resistance elements therein is varied to vary the voltage drop across the bridge circuit. This voltage variation is detected by the voltage sensing element and transmitted to the recorder as a pulse or signal which is different from the pulse transmitted in the absence of the gating pulses. The voltage sensing element is connected to the bridge circuit in such a manner that the grid to cathode bias of the element does not vary when the impedance of the bridge circuit is varied, thus eliminating any "keying click" transient which would occur if the grid to cathode bias varied and which would blur or obscure the desired timing signal.

Figure 1:
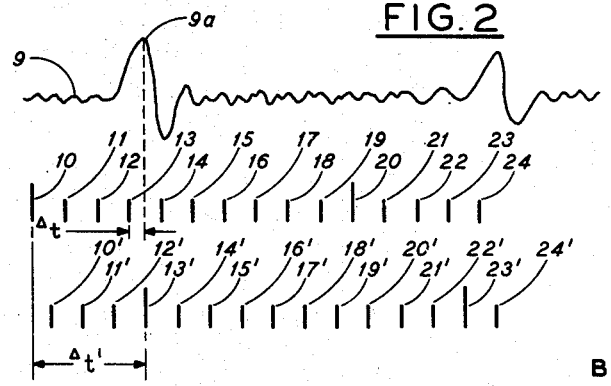

The nature and objects of the present invention will be further apparent from the following description when read in connection with the accompanying drawing, in which:

Fig. 1 is a graph illustrating a representative seismic detector signal and a train of timing signals associated therewith.

Figure 2:
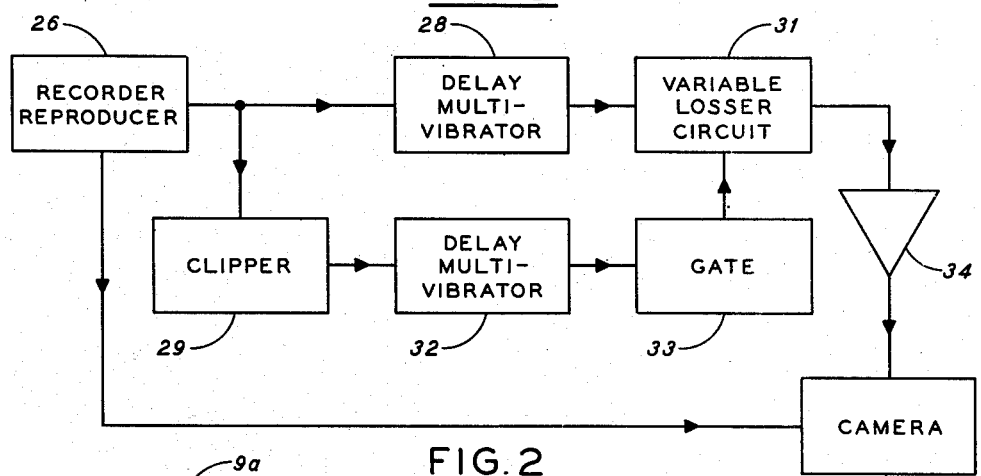

Fig. 2 diagrammatically illustrates one embodiment of the present invention; and Fig. 3 illustrates the circuitry of the improved variable losser network of the present invention.

Referring to Fig. 1 by character of reference, numeral 9 designates a representative seismic detector signal plotted as a function of time, representing the signal as recorded on a reproducible recording medium. Although, for simplicity, only one seismic detector signal has been illustrated, it will be understood that in practice a considerable number of such signals are normally obtained for each seismic disturbance. Associated with signal 9 is a train of timing signals consisting of a series of substantially identical, spaced signals separated at regular intervals by signals of distinctive character. As illustrated in Fig. 1, the train may be considered to commence with a signal of distinctive character 10, followed by a series of substantially identical, spaced signals 11 through 19, and another signal of distinctive character 20. In the particular embodiment shown in Fig. 1, the interval between signals 10 and 20 could represent a tenth of a second and the intervening intervals would correspond to intervals of $\frac{1}{100}$ of a second, or 10 milliseconds. Although only a portion of the train of timing signals has been illustrated, it will be understood that the timing signals are a periodic series extending along the seismic record and are recorded simultaneously with the seismic detector signals.

It will be seen that seismic detector signal 9 has a prominent peak portion 9a, and it will also be seen that this peak portion 9a does not coincide exactly with any of the timing lines on the record, falling between timing lines 13 and 14. Assuming that peak 9a is a reference event from which it is desired to compute subsequent events or reflections on the record, and that it is desired to reproduce seismic detector signal 9 from the reproducible recording device to the auxiliary recording medium with peak portion 9a substantially coincident with a timing signal of distinctive character, the operation would be as follows. Referring to Fig. 2, numeral 26 designates the recording and reproducing device on which the seismic detector signals and the train of timing signals are recorded and from which these signals are reproduced. Seismic detector signal 9 may be reproduced through one channel of recording device 26 and supplied to an oscillographic camera 27.

The timing signals are reproduced from device 26 simultaneously with the seismic detector signal or signals and are supplied jointly to a first delay network 28 and an amplitude discriminating network 29. Delay network 28 is preferably a delay multivibrator which equalizes the amplitudes of the pulses or signals passing therethrough and delays each of these signals by an adjustable amount. The output from delay multivibrator 28 is supplied to a variable losser network 31 in which the amplitude of the signals passing therethrough may be varied in a predeterminable manner.

Amplitude discriminator network or clipper 29 discriminates against signals having amplitudes less than a predetermined minimum value, which minimum value is adjusted to be greater than the amplitude of the timing signals 11 through 19, 21 through 29, etc., so that only the timing signals of distinctive character, i. e., 10, 20, etc., pass through network 29. These signals of distinctive character from network 29 are supplied to a second delay network comprising a delay multivibrator 32 which equalizes the amplitudes of the signals and delays them by an adjustable amount. The output pulses from delay multivibrator network 32 are supplied to a gating network 33 which is responsive to each of the output signals of delay multivibrator network 32 to supply a gating impulse to variable losser network 31. This gating impulse acts to increase the amplitude of the particular signal which is passing through variable losser network 31 at the time of occurrence of the gating pulse. The output from variable losser network 31 is supplied through an amplifier 34 to the timing channel of oscillographic camera 27 for recording simultaneously with the reproduced seismic detector signal or signals from device 26.

The operation of the present invention may be best understood by considering Figs. 1 and 2 together.

From Fig. 1 it will be seen that reference peak 9a of seismic detector signal 9 is separated from the closest earlier timing line, which is timing line 13, by an amount which is designated at $\Delta t$. Thus, the entire train of timing signals must be shifted by the amount $\Delta t$ to bring a timing line into coincidence with peak portion 9a. Similarly, peak portion 9a is separated from the nearest earlier distinctive timing line, which is timing line 10, by an amount designated $\Delta t'$. In operation, therefore, the delay in delay multivibrator network 28 is adjusted to be equal to the amount $\Delta t$ as determined from the seismic record, so that the entire train of timing signals through delay network 28 is delayed by an amount $\Delta t$. The delay of delay multivibrator network 32 is adjusted to be approximately equal to the time $\Delta t'$ so that the signals of distinctive character passing through amplitude discriminator network 29 are delayed in delay network 32 by an amount corresponding to $\Delta t'$.

As the timing signals are reproduced from device 26, timing signals 10, 11, and 12 are each equalized in amplitude, delayed by an amount $\Delta t$ and passed through losser network 31. The amplitudes of these signals from losser network 31, represented as 10', 11', and 12', are all equal, since losser network 31 does not receive a gating impulse from gating network 33 during occurrence of the signals. However, when delayed timing signal 13 is passing through losser 31, gating network 33 is triggered by the delayed timing signal 10 so that the gain of losser network 31 is abruptly increased to increase the amplitude of the signal passing therethrough. This action increases the amplitude of timing signal 13 to produce a timing signal 13' having an amplitude of distinctive character coincident with the occurrence of peak 9a.

Timing signals 14', 15', 16', 17', 18', 19', 20', 21', and 22' then pass through variable losser network 31 at normal amplitude until gating network 33 is again triggered, this time by delayed timing signal 20, to increase the amplitude of the signal passing through the losser network, and thus create timing signal 23'. This operation continues for the duration of the seismic signal, with each delayed signal of distinctive character from clipper 29 and delay multivibrator 32 operating gate 33 to increase the amplitude of the signal then passing through variable losser 31. Thus the train of timing signals is effectively shifted to produce coincidence of peak portion 9a with a timing signal of distinctive character and the original spatial relationship of the original timing signals on the record is substantially maintained, since the amount by which the signals are actually shifted is small compared to the period of any nonuniformity of spacing of the original timing signal train. The gating period of gating network 33 may be made quite large, equal to at least one-half of the interval between timing lines, so that considerable tolerance is permitted in the adjustment of the time delay $\Delta t'$ without affecting the operation or the sharpness of the new timing signals of distinctive character.

Fig. 3 illustrates a preferred form of variable losser network for use in the present invention. As shown in Fig. 3 the output from delay multivibrator 28, which output consists of a series of positive pulses, is differentiated by a network including a capacitor 41 to produce a series of alternate positive and negative pips or spikes. The negative pips are eliminated by a half-wave rectifier 43 and the resultant positive pulses are fed to a voltage-dividing bridge circuit including a resistor 44. Two adjacent arms of the bridge are composed of diodes 45 and 46 whose resistances vary as a function of the voltage thereacross. The other arms of the bridge are formed by a pair of resistors 47 and 48, and a pair of resistors 49 and 51 are serially connected between a pair of terminals 52 and 53. The output of gating network 33 is connected across terminals 52 and 53, and the output of the voltage dividing bridge network is supplied to an amplifying tube 55 having an anode 55a, a grid 55b, and a cathode 55c. Cathode 55c of tube 55 is connected to the junction of resistors 49 and 51, and grid 55b is connected to the junction of diodes 45 and 46 to impress a variable signal voltage between the grid and cathode of tube 55. The output from tube 55 is supplied to the timing channel of camera 27.

In operation, the delayed pulses from delay multivibrator network 28 are differentiated and the negative portions clipped by half-wave rectifier 43. The remaining positive pulses are then supplied to the bridge network through resistor 44. In the absence of a gating impulse from gating network 33, the division of voltage between resistor 44 and the bridge network is such as to impress between grid 55b and cathode 55c a predetermined voltage upon occurrence of each of the delayed timing pulses. These timing pulses are amplified in tube 55 and supplied as timing impulses to camera 27. When gating network 33 is triggered by operation of multivibrator 32, the output voltage of gating network 33 is impressed between terminals 52 and 53 to vary the voltage across diodes 45 and 46 and thus vary their resistances. This variation in resistance varies the distribution of voltage between resistor 44 and the bridge network, so that when the next timing signal is supplied from delay multivibrator 28, a larger portion of this signal is impressed on tube 55 to produce a timing pulse of distinctive character which is supplied to camera 27.

It will be noted that with cathode 55c connected to the junction between resistors 49 and 51, a variation in the voltage between terminals 52 and 53 does not vary the grid to cathode bias of tube 55, since this tube is connected at the midpoint of these elements. Thus no "keying click" transient is produced in tube 55 upon operation of gating network 33 so that the resultant timing signal is not obscured by keying click transients.

Although but a few illustrative embodiments of the present invention have been described, it will be apparent to those skilled in the art that various changes and modifications may be made therein without departing from the spirit of the invention or the scope of the appended claims.

I claim:

1. Apparatus for producing an effective time shift in a train of timing signals which consists of a periodic series of substantially identical spaced signals separated at regular intervals by signals of distinctive character, comprising a first delay network for delaying all of said signals by a first predetermined amount, a second delay network connected in parallel with said first network for separately delaying said distinctive signals by a second predetermined amount, a characteristic-changing network connected to the output of said first delay network, a gating network, means connecting said second delay network to said gating network to generate a gating impulse upon occurrence of each of said delayed signals from said second delay network, and means connecting said gating network to said characteristic-changing network to vary a characteristic of the signal passing through said characteristic-changing network during occurrence of said gating impulse.

2. Apparatus for producing an effective time shift in a train of timing signals which consists of a periodic series of substantially identical spaced signals separated at regular intervals by signals of distinctive character, comprising a first delay network for delaying all of said signals by a first predetermined amount, a second delay network connected in parallel with said first network for separately delaying said distinctive signals by a second predetermined amount, a variable attenuator network connected to the output of said first delay network, a gating network, means connecting said second delay network to said gating network to generate a gating impulse upon occurrence of each of said delayed signals from said second delay network, and means connecting said gating network to said variable attenuator network to increase the amplitude of the signal passing through said variable attenuator network during occurrence of said gating impulse.

3. Apparatus for producing an effective time shift in a train of timing signals which consists of a periodic series of substantially identical spaced signals separated at regular intervals by signals of distinctive character, comprising a first network for equalizing the amplitudes of all of said signals and for delaying all of said signals by a first predetermined amount, a second delay network connected in parallel with said first network for separately delaying said distinctive signals by a second predetermined amount, a variable attenuator network connected to the output of said first delay network, a gating network, means connecting said second delay network to said gating network to generate a gating impulse upon occurrence of each of said delayed signals from said second delay network, and means connecting said gating network to said variable attenuator network to increase the amplitude of the signal passing through said variable attenuator network during occurrence of said gating impulse.

4. Apparatus for producing an effective time shift in a train of timing signals which consists of a periodic series of spaced signals of equal amplitude separated at regular intervals by signals of greater amplitude comprising an amplitude-equalizing network for equalizing the amplitudes of all of said signals, a first delay network connected to said amplitude-equalizing network for delaying all of said amplitude-equalized signals by a first predetermined amount, a second delay network connected in parallel with said amplitude-equalizing network for delaying said signals of greater amplitude by a second predetermined amount, a variable attenuator network connected to the output of said first delay network, a gating network, means connecting said second delay network to said gating network to generate a gating impulse upon occurrence of each of said delayed signals from said second delay network, and means connecting said gating network to said variable attenuator network to increase the amplitude of the signal passing through said variable attenuator network during occurrence of said gating impulse.

5. Apparatus for producing an effective time shift in a train of timing signals which consists of a periodic series of substantially identical spaced signals separated at regular intervals by signals of distinctive character, comprising a first delay network for delaying all of said signals by a first predetermined amount, a second delay network connected in parallel with said first network for delaying said distinctive signals by a second predetermined amount, a variable attenuator network connected to the output of said first delay network, a gating network, means connecting said second delay network to said gating network to generate a gating impulse upon occurrence of each of said delayed signals from said second delay network, said gating impulse having a duration less than the interval between said signals, and means connecting said gating network to said variable attenuator network to increase the amplitude of the signal passing through said variable attenuator network during occurrence of said gating impulse.

6. Apparatus for producing an effective time shift in a train of timing signals which consists of a periodic series of substantially identical spaced signals separated at regular intervals by signals of distinctive character, comprising a first delay network for delaying all of said signals by a first predetermined amount, a second delay network connected in parallel with said first network for delaying said distinctive signals by a second predetermined amount, a variable attenuator network connected to the output of said first delay network, a gating network, means connecting said second delay network to said gating network to generate a gating impulse upon occurrence of each of said delayed signals from said second delay network, said gating impulse having a duration equal to at least one-half the interval between said signals, and means connecting said gating network to said variable attenuator network to increase the amplitude of the signal passing through said variable attenuator network during occurrence of said gating impulse.

7. Apparatus for producing an effective time shift in a train of timing signals which consists of a periodic series of substantially identical spaced signals separated at regular intervals by signals of distinctive character, comprising an amplitude equalizing network for equalizing the amplitudes of all of said signals, a clipping network connected in parallel with said amplitude-equalizing network and responsive only to said signals of distinctive character for removing said identical signals from said train, a first delay network connected to said amplitude-equalizing network for delaying all of said amplitude-equalized signals by a predetermined amount, a second delay network connected to said clipper network for delaying said distinctive signals by a second predetermined amount, a variable attenuator network connected to the output of said first delay network, a gating network, means connecting said second delay network to said gating network to generate a gating impulse upon occurrence of each of said delayed signals from said second delay network, and means connecting said gating network to said variable attenuator network to increase the amplitude of the signal passing through said variable attenuator network during occurrence of said gating impulse.

8. Apparatus for producing an effective time shift in a train of timing signals which consists of a periodic series of substantially identical spaced signals separated at regular intervals by signals of distinctive character, comprising an amplitude-equalizing network for equalizing the amplitude of all of said signals, a clipping network connected in parallel with said amplitude-equalizing network and responsive only to said signals of distinctive character for removing said identical signals from said train, a first delay network connected to said amplitude-equalizing network for delaying all of said amplitude-equalized signals by a predetermined amount, a second delay network connected to said clipper network for delaying said distinctive signals by a second predetermined amount, a variable attenuator network connected to the output of said first delay network, a gating network, means connecting said second delay network to said gating network to generate a gating impulse upon occurrence of each of said delayed signals from said second delay network, said gating impulse having a duration less than the interval between said signals, and means connecting said gating network to said variable attenuator network to increase the amplitude of the signal passing through said variable attenuator network during occurrence of said gating impulse.

9. Apparatus for producing an effective time shift in a train of timing signals which consists of a periodic series of substantially identical spaced signals separated at regular intervals by signals of distinctive character, comprising an amplitude-equalizing network for equalizing the amplitude of all of said signals, a clipping network connected in parallel with said amplitude-equalizing network and responsive only to said signals of distinctive character for removing said identical signals from said train, a first delay network connected to said amplitude-equalizing network for delaying all of said amplitude-equalized signals by a predetermined amount, a second delay network connected to said clipper network for delaying said distinctive signals by a second predetermined amount, a variable attenuator network connected to the output of said first delay network, a gating network, means connecting said second delay network to said gating network to generate a gating impulse upon occurrence of each of said delayed signals from said second delay network, said gating impulse having a duration equal to at least one-half the interval between said signals, and means connecting said gating network to said variable attenuator network to increase the amplitude of the signal passing through said variable attenuator network during occurrence of said gating impulse.

References Cited in the file of this patent

UNITED STATES PATENTS

| | | |
|---|---|---|
| 2,098,370 | Bartels | Nov. 9, 1937 |
| 2,212,967 | White | Aug. 27, 1940 |
| 2,299,945 | Wendt | Oct. 27, 1942 |
| 2,420,516 | Bischoff | May 13, 1947 |
| 2,443,195 | Pensyl | June 15, 1948 |
| 2,584,599 | Luck | Feb. 5, 1952 |

OTHER REFERENCES

Cooke and Markus: "Electronics Dictionary," p. 210, McGraw-Hill.